(12) United States Patent
Jeon

(10) Patent No.: US 7,298,434 B2
(45) Date of Patent: Nov. 20, 2007

(54) LIQUID CRYSTAL DISPLAY DEVICE WHEREIN LIGHT GUIDE PLATE HAVING PARTICULAR PATTERNS

(75) Inventor: Seong Man Jeon, Seoul (KR)

(73) Assignee: LG.Philips LCD Co., Ltd, Seoul (KR)

( * ) Notice: Subject to any disclaimer, the term of this patent is extended or adjusted under 35 U.S.C. 154(b) by 204 days.

(21) Appl. No.: 10/952,809

(22) Filed: Sep. 30, 2004

(65) Prior Publication Data

US 2005/0140847 A1    Jun. 30, 2005

(30) Foreign Application Priority Data

Dec. 24, 2003    (KR) .................... 10-2003-0096704

(51) Int. Cl.
*G02F 1/1335* (2006.01)

(52) U.S. Cl. ............................ 349/62; 349/61; 362/31; 362/26

(58) Field of Classification Search ............ 349/60–62, 349/69; 362/26, 31, 531, 61, 561

See application file for complete search history.

(56) References Cited

U.S. PATENT DOCUMENTS

| 5,584,556 | A | * | 12/1996 | Yokoyama et al. | ......... | 362/625 |
| 6,752,505 | B2 | * | 6/2004 | Parker et al. | ............... | 362/627 |
| 2004/0130912 | A1 | * | 7/2004 | Miyashita | .................... | 362/561 |
| 2004/0141103 | A1 | * | 7/2004 | Kotchick et al. | ............. | 349/61 |
| 2005/0024846 | A1 | * | 2/2005 | Yu et al. | ....................... | 362/31 |

* cited by examiner

*Primary Examiner*—Mike Qi
(74) *Attorney, Agent, or Firm*—Birch, Stewart, Kolasch & Birch, LLP

(57) ABSTRACT

A liquid crystal display device has a uniform viewing angle and a reduced cost of a production. The liquid crystal display device includes a light guide plate converting the light from a lamp into a surface light to irradiate the liquid crystal display panel. Multiple patterns, each of the patterns being formed in the light guide plate, have a first curvature of a first sectional surface and a second curvature of a second sectional surface which are different from each other.

30 Claims, 16 Drawing Sheets

LIQUID CRYSTAL DISPLAY DEVICE WHEREIN LIGHT GUIDE PLATE HAVING PARTICULAR PATTERNS

This application claims priority under 35 U.S.C. §119 of Korean Patent Application No. P2003-96704 filed in Korea on Dec. 24, 2003, which is hereby incorporated by reference.

BACKGROUND OF THE INVENTION

1. Field of the Invention

The invention relates to a liquid crystal display device and more particularly, to a liquid crystal display device capable of having a uniform viewing angle while reducing the cost of production.

2. Description of the Related Art

Liquid crystal display (hereinafter, LCD) devices have trended to have increasingly wider application scope due to lightness, thinness, and low power consumption of these devices. Accordingly, LCD devices find use in office automation devices, audio/video devices and the like.

An LCD device adjusts the transmittance of a light beam in accordance with an image signal applied to multiple control switches arranged as a matrix in order to display desired pictures in a screen.

Since an LCD is not a self-luminescent device, the LCD requires a light source such as a back light unit. There are two types of back light units, i.e., a direct-below-type and an edge-type. The direct-below-type diffuses light generated from multiple lamps arranged in parallel at a rear surface of a diffusion plate by using the diffusion plate to irradiate the light. The edge-type irradiates light irradiated from a lamp through an incident surface provided at a side surface of a transparent light guide plate.

FIG. 1 shows a related art liquid crystal display adopting an edge-type back light unit that includes a main support 22, a backlight unit and a liquid crystal display panel 6 stacked inside of the main support 22. A top case 2 encloses the edge of the liquid crystal display panel 6 and the side surface of the main support 22.

The liquid crystal display panel 6 includes an upper substrate 3 and a lower substrate 5. Liquid crystal materials are injected between the upper substrate 3 and the lower substrate 5. The liquid crystal display panel 6 is provided with a spacer (not shown) to constantly keep a gap between the upper substrate 3 and the lower substrate 5. The upper substrate 3 of the liquid crystal display panel 6 is provided with a color filter, a common electrode and a black matrix (not shown). Signal lines such as a data line and a gate line (not shown) are formed on the lower substrate 5 of the liquid crystal display panel 6. A thin film transistor (TFT) is formed at an intersection between the data line and the gate line. The TFT switches a data signal to be transmitted from the data line to the liquid crystal cell in response to a scanning signal (i.e., a gate pulse) from the gate line. A pixel electrode is formed at a pixel area between the data line and the gate line. One side of the lower substrate 5 is provided with a pad area connected to each of the data line and the gate line. A tape carrier package (not shown), having a driver integrated circuit mounted thereon for applying a driving signal to the TFT, is attached onto the pad area. This tape carrier package applies a data signal from the driver integrated circuit to the data line. The tape carrier package also supplies the scanning signal to the gate line.

An upper polarizing sheet is attached onto the upper substrate 3 of the liquid crystal display panel 6, and a lower polarizing sheet is attached onto the rear side of the lower substrate 5 of the liquid crystal display panel 6.

The main support 22 is made of a molded material, and its inner wall is molded into a stepped coverage face. A securing part, in which the back light unit and the liquid crystal display panel 6 are disposed, is formed on the stepped coverage face. The back light unit and the liquid crystal display panel 6 are sequentially stacked on the stepped coverage face of the main support 22.

The back light unit, as shown in FIG. 2, includes a lamp 26 irradiating light onto the liquid crystal display panel 6, and a lamp housing 28 enclosing the lamp 26. A light guide plate 18 directs light incident from the lamp 26 toward the liquid crystal display panel 6. A reflection sheet 20 is arranged on a rear surface of the light guide plate 18. Optical sheets 10, 12, 14 and 16 are stacked over the light guide plate 18.

A cold cathode fluorescent lamp is mainly used as the lamp 26. The light generated from the lamp 26 is incident to the light guide plate 18 through a surface provided at one side of the light guide plate 18.

The lamp housing 28 includes a reflective surface in its inside, and the lamp housing 28 is installed to enclose the lamp 26, to thereby reflect the light generated from the lamp 26 toward the incident surface of the light guide plate 18.

The reflection sheet 20 is located at the rear surface of the light guide plate 18. The reflection sheet 20 serves to re-reflect light incident thereto, through the rear surface of the light guide plate 18, onto the light guide plate 18, thereby reducing the light loss. In other words, a portion of the light emitted from the lamp 26 progresses toward the rear surface of the light guide plate 18, and this light is then reflected from the reflection sheet 20 to progress toward the liquid crystal display panel 6.

The light guide plate 18 converts linear light provided by the lamp 26 into surface light, and the light guide plate 18 guides the light into the liquid crystal display panel 6. To this end, an inclined surface having a designated slant is formed on the rear surface of the light guide plate 18. Formed on the inclined surface are multiple printed patterns 52 spaced apart from each other by a designated distance. Accordingly, the light guide plate 18 makes light uniformly progress by being provided with a light receiving part toward an outgoing surface facing the liquid crystal display panel 6. Also, the light progressing toward the rear surface of the light guide plate 18 reflects from the reflection sheet 20, to thereby progress toward the outgoing surface.

The efficiency of the light incident to the liquid crystal panel 6 maximizes when the incident light is perpendicular to the liquid crystal panel 6. Accordingly, the optical sheets 10, 12, 14 and 16 convert the light outputted from the light guide plate 18 to be perpendicular to the liquid crystal panel 6, to thereby improve the efficiency of the light. To this end, a lower diffusing sheet 10 diffuses the light from the light guide plate 18 into an entire area, first and second prism sheets 12 and 14 change a progressing angle of the light diffused by the lower diffusing sheet to be perpendicular to the liquid crystal display panel 6, and an upper diffusing sheet 16 diffuses the light going through the first and second prism sheets 12 and 14. Accordingly, the light provided from the light guide plate 18 is incident, via the optical sheets 10, 12, 14 and 16, to the liquid crystal display panel 6.

Meanwhile, the related art liquid crystal display device supports the lamp housing 28 enclosing the lamp 26, and the device further includes a bottom cover 24 for radiating light generated from the lamp housing 28.

The bottom cover 24 includes a plane part and a side part perpendicularly bent with respect to each other in order to enclose a rear surface and a side surface at one side of the main support 22. A screw hole through which a screw (not shown) penetrates is formed at the side of the bottom cover 24. The bottom cover 24 is joined by the screw and is fixed in the main support 22.

The top case 2 is manufactured into a square band shape having a plane part and a side part perpendicularly bent with respect to each other. The top case 2 encloses the edge of the liquid crystal display panel 6 and the main support 22. The top case 2 is joined to the main support 22 by the screw (not shown).

As set forth above, the related art liquid crystal display device has the light incident from the lamp 26 to the light guide plate 18 progressing toward the liquid crystal display panel 6 through the use of the printed pattern 52. The related art liquid crystal display device tries to achieve a uniform distribution of light by using the printed pattern 52 formed on an inclined surface of the liquid guide plate 18. However, a disadvantage arises in that the viewing angle of light provided from the light guide plate 18, as shown in FIG. 3, cannot be uniform over the full angle. Further, the related art liquid crystal display device requires the upper and lower diffusing sheets 10 and 16, and the first and the second prism sheets 12 and 14 in order to adjust the direction of the light outputted through the light guide plate 18 and secure an uniform viewing angle at the full angular displacement. Accordingly, since the first and the second prism sheets 12 and 14 are necessarily employed in the related art liquid crystal display device, the production cost becomes high.

Further, since the light outputted from the light guide plate 18 irradiates via the first and the second prism sheets 12 and 14 to the liquid crystal display panel, a light loss occurs. As a result, the brightness lowers. Thus, the display quality of the liquid crystal display device is deteriorates from the lowered brightness.

SUMMARY OF THE INVENTION

Accordingly, it is an object of the invention to provide a liquid crystal display device capable of having a uniform viewing angle and reducing the cost of a production.

The invention, in part, pertains to a liquid crystal display device that includes a liquid crystal display panel, a lamp irradiating light to the liquid crystal display panel, a light guide plate converting the light from the lamp into a surface light to irradiate to the liquid crystal display panel, and multiple patterns, each of the patterns being formed in the light guide plate and having a first curvature of a first sectional surface and a second curvature of a second sectional surface which are different from each other.

In the invention, each of the patterns can include a pillar having a first lateral wall element and a second lateral wall element which have different heights from each other in the first sectional surface direction, a third lateral wall element and a fourth lateral wall element which have same heights with each other in the second sectional surface direction, a first curved surface formed between the first and the second lateral walls, and a second curved surface formed between the third and the fourth lateral walls.

In the invention, any one of the first and the second lateral walls faces the lamp. The patterns can be substantially arranged in a matrix type configuration. Distances between the patterns can become gradually narrow as the patterns are farther from the lamp. The patterns can be gathered in a designated number to form each of pattern groups. The number of the patterns grouped in each of the pattern groups can gradually increase as the pattern groups are farther from the lamp. The patterns can be grouped in a shape of an ellipse in each of the pattern groups. The lamp can be arranged to face to one side surface of the light guide plate. The lamp can be bent to face at least two side surfaces of the light guide plate.

The invention, in part, pertains to a liquid crystal display device having a liquid crystal display panel a lamp irradiating light to the liquid crystal display panel, a light guide plate converting the light from the lamp into a surface light to irradiate to the liquid crystal display panel, a film attached to a rear surface of the light guide plate, and multiple patterns. Each of the patterns are formed in the film and have a first curvature of a first sectional surface and a second curvature of a second sectional surface which are different from each other.

In the invention, each of the patterns can include a pillar having a first lateral wall element and a second lateral wall element which have different heights from each other in the first sectional surface direction, and a third lateral wall element and a fourth lateral wall element which have same heights with each other in the second sectional surface direction, a first curved surface formed between the first and the second lateral walls elements, and a second curved surface formed between the third and the fourth lateral walls. The device can further include an ultraviolet-hardening resin attaching the film to the light guide plate.

The invention, in part, pertains to a light guide plate, which includes multiple patterns, each of the patterns being formed in the light guide plate and having a first curvature of a first sectional surface and a second curvature of a second sectional surface which are different from each other.

BRIEF DESCRIPTION OF THE DRAWINGS

These and other objects of the invention will be apparent from the following detailed description of the embodiments of the invention with reference to the accompanying drawings, in which.

DETAILED DESCRIPTION

Reference will now be made in detail to the preferred embodiments of the invention, examples of which are illustrated in the accompanying drawings. Hereinafter, the preferred embodiments of the invention will be described in detail with reference to FIGS. 4 to 16.

Figure 1:
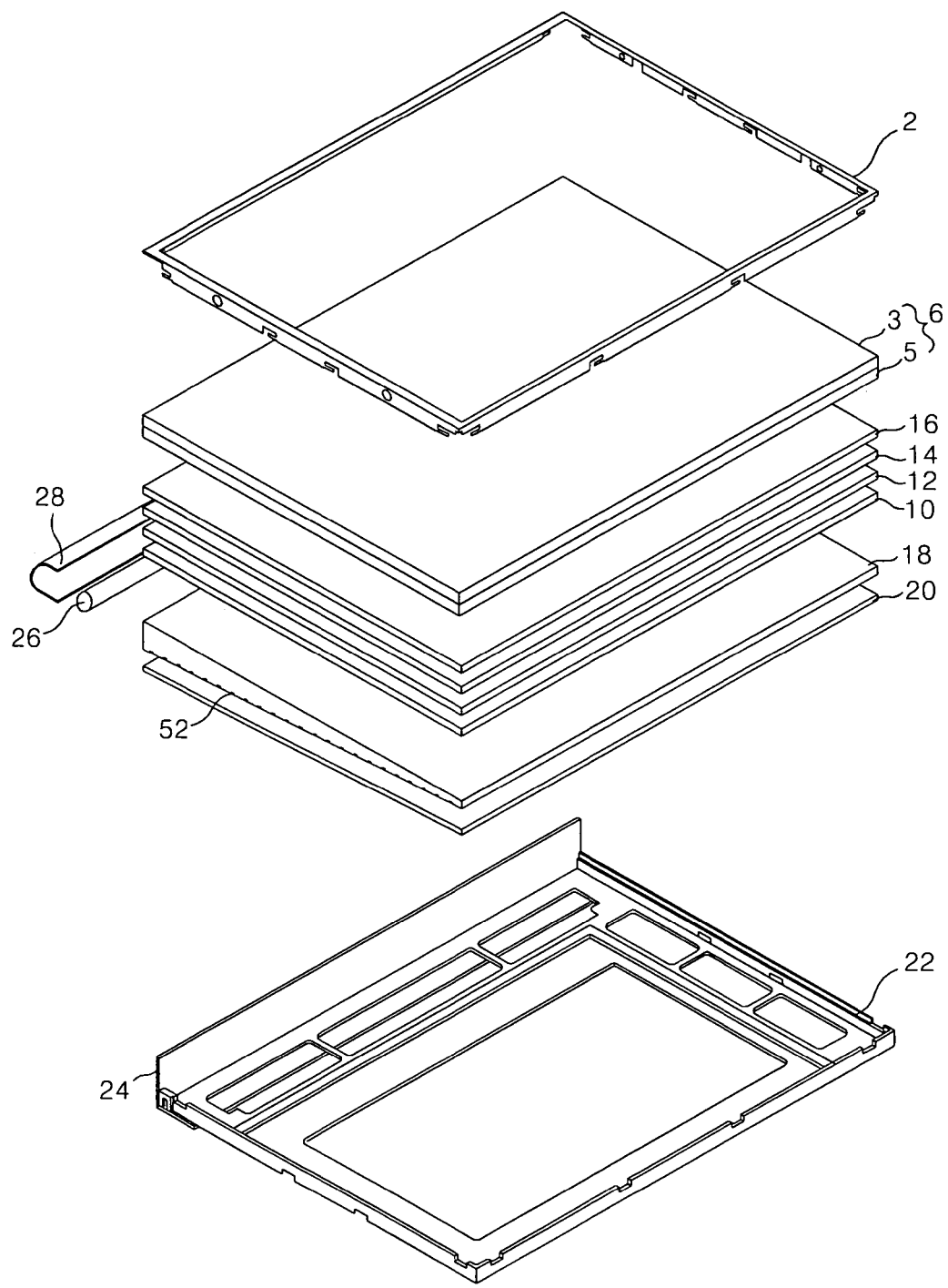
FIG. 1 shows a schematic perspective view illustrating a liquid crystal display device adopting a related art edge-type back light unit.
Figure 2:
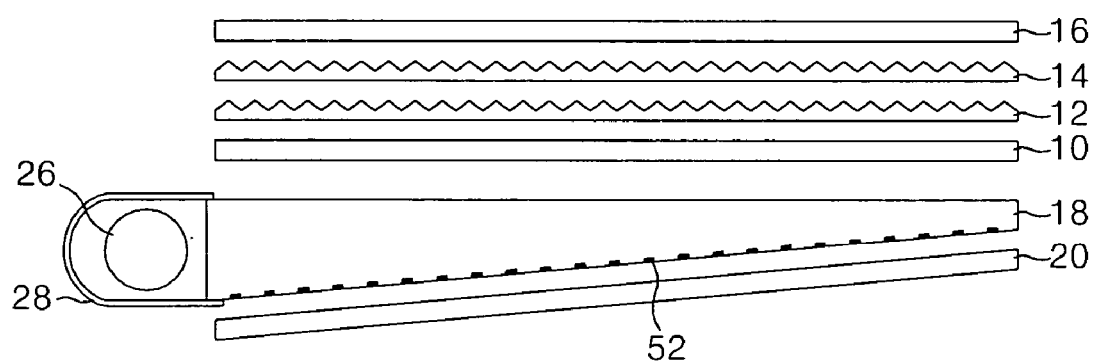
FIG. 2 shows a configuration of the back light unit shown in FIG. 1.
Figure 3:
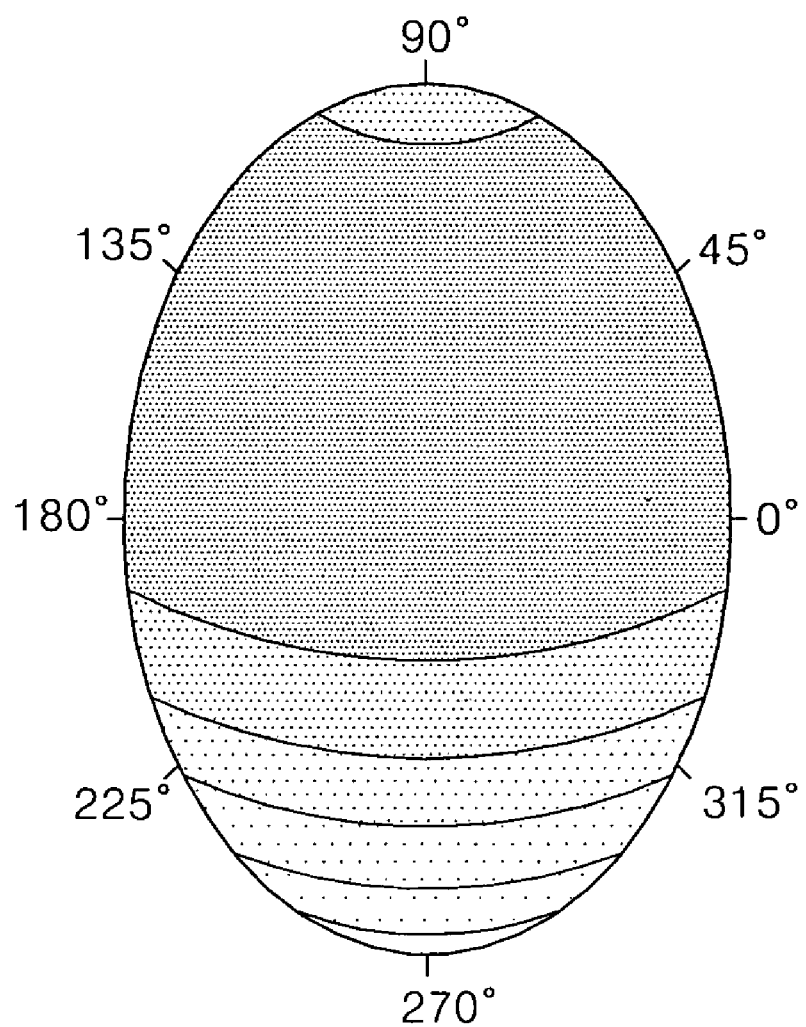
FIG. 3 diagrams a distribution of the viewing angle of the light guide plate shown in FIG. 2.
Figure 4:
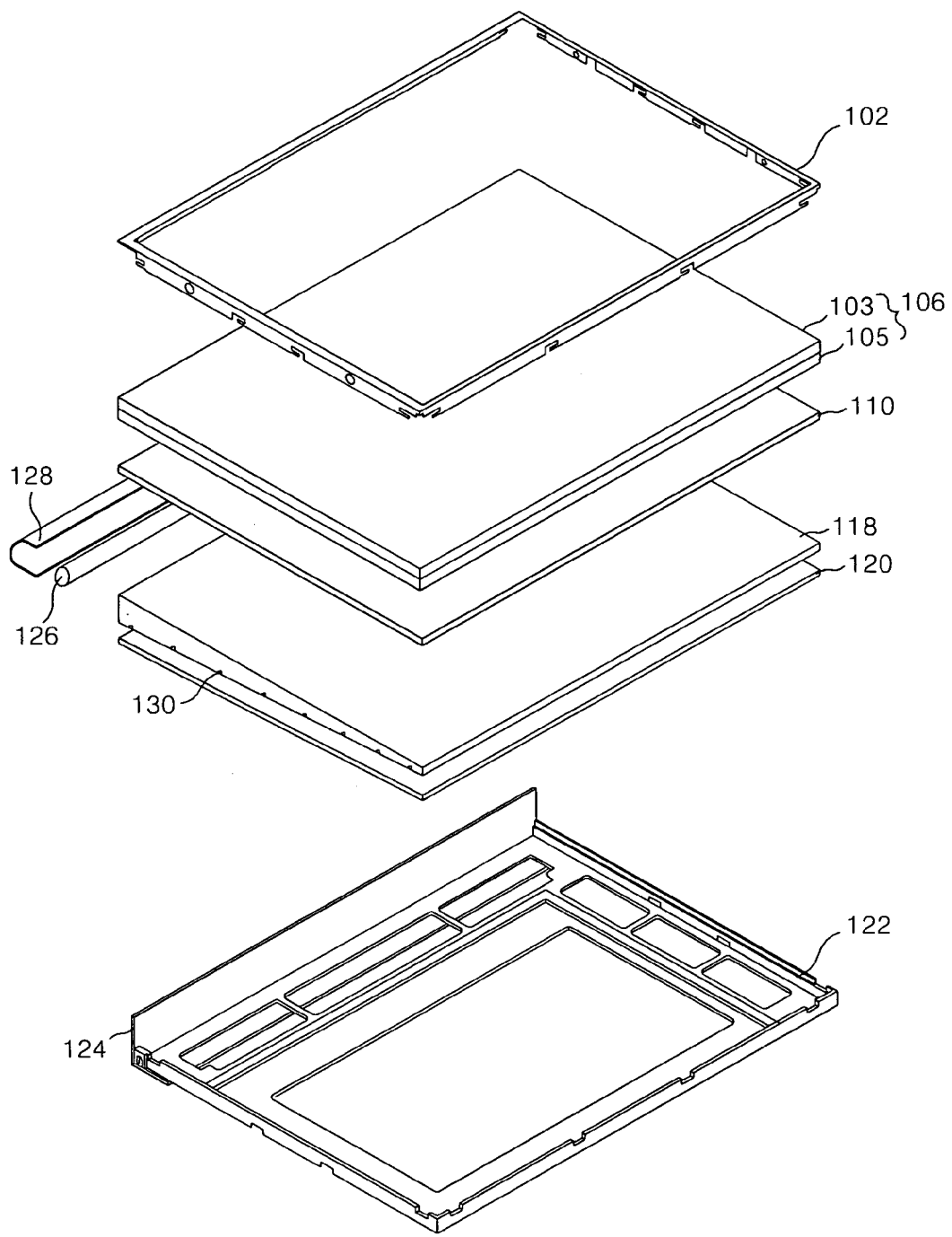
FIG. 4 shows a schematic perspective view illustrating a liquid crystal display device according to a first embodiment of the invention.

FIG. 4 shows a liquid crystal display according to a first embodiment of the invention. The inventive display includes a main support 122, a back light unit and a liquid crystal display panel 106 stacked within the main support 122. The back light unit includes a light guide plate 118 provided with multiple minute lens type intaglio patterns 130 in which a first curvature of a first sectional surface and a second curvature of a second sectional surface are different from each other. A top case 102 encloses the edge of the liquid crystal display panel 106 and the side surface of the main support 122.

The liquid crystal display panel 106 includes an upper substrate 103 and a lower substrate 105. Liquid crystal materials are injected between the upper substrate 103 and the lower substrate 105. The liquid crystal display panel 106 is provided with a spacer (not shown) to constantly keep a gap between the upper substrate 103 and the lower substrate 105. The upper substrate 103 of the liquid crystal display panel 106 is provided with a color filter, a common electrode and a black matrix (not shown). Signal lines such as a data lines and a gate line (not shown) are formed at the lower substrate 105 of the liquid crystal display panel 106. A thin film transistor (TFT) is formed at a crossing of the data line and the gate line. The TFT switches the data signal to be transmitted from the data line to the liquid crystal cell in response to a scanning signal (i.e., a gate pulse) from the gate line. A pixel electrode is formed at a pixel area between the data line and the gate line. One side of the lower substrate 105 is provided with a pad area connected to each of the data line and the gate line. A tape carrier package (not shown), having a driver integrated circuit mounted thereon for applying a driving signal to the TFT, is attached to the pad area. This tape carrier package applies a data signal from the driver integrated circuit to the data line. Also, the tape carrier package supplies the scanning signal to the gate line.

An upper polarizing sheet is attached to the upper substrate 103 of the liquid crystal display panel 106, and a lower polarizing sheet is attached onto of the rear side of the lower substrate 105 of the liquid crystal display panel 106.

The main support 122 is made of a molded material such as a thermoplastic resin, and its inner wall is molded into a stepped coverage face. A securing part (which can be notches) in which the back light unit and the liquid crystal display panel 106 are disposed is formed on the stepped coverage face. The back light unit and the liquid crystal display panel 106 are sequentially stacked over the stepped coverage face of the main support 122.

Figure 5:
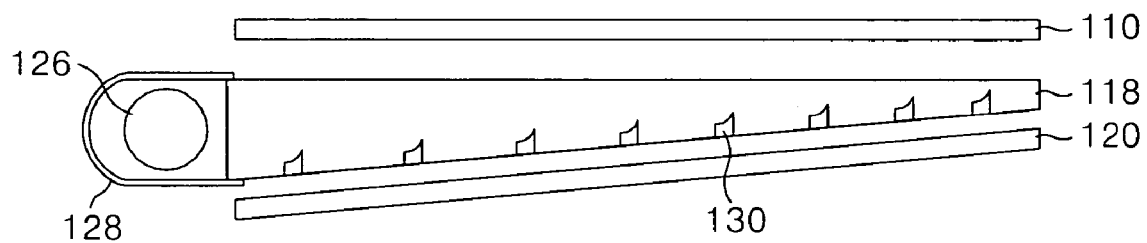
FIG. 5 shows a sectional view of the back light unit shown in FIG. 4.

FIG. 5 shows the back light unit according to the first embodiment of the invention. This back light unit includes a lamp 126 irradiating light onto the liquid crystal display panel 106. A lamp housing 128 encloses the lamp 126, and a light guide plate 118 directs light incident from the lamp 126 toward the liquid crystal display panel 106 through the use of the minute lens type intaglio patterns 130. A reflection sheet 120 is arranged over a rear surface of the light guide plate 118, and a diffusion sheet 110 stacks on the light guide plate 118.

A cold cathode fluorescent lamp is mainly used for the lamp 126. However, the invention is not restricted to a cold cathode fluorescent lamp, and any appropriate lamp can be used. The light generated from the lamp 126 is incident to the light guide plate 118 through an incident surface provided at one side of the light guide plate 118.

The lamp housing 128 includes a reflection surface on its interior, and the lamp housing 128 is installed to enclose the lamp 126, to thereby reflect the light generated by the lamp 126 toward the incident surface of the light guide plate 118.

The reflection sheet 120 is located at the rear surface of the light guide plate 118. The reflection sheet 120 serves to re-reflect light incident thereto, through the rear surface of the light guide plate 118 into the light guide plate 118, thereby reducing a light loss. In other words, the light progressing toward the rear surface of the light guide plate 118 (from among the total light outputted from the lamp 126) reflects from the reflection sheet 120 to proceed toward the liquid crystal display panel 106.

The diffusion sheet 110 diffuses the light from the light guide plate 118 to irradiate the liquid crystal display device.

The light guide plate 118 converts linear light incident from the lamp 126 to a surface light to thereby guide the light to the liquid crystal display panel 106. To this end, an inclined surface having a designated inclination is formed on the rear surface of the light guide plate 18. Formed over the inclination surface are multiple minute lens type intaglio patterns 130 arranged in a matrix, as shown in FIG. 6.

As the light entering the light guide plate 118 from the lamp 126 goes toward an end of the light guide plate 118, the intensity of light decreases. Accordingly, uniformly outputting the light from the light guide plate 118 is achieved by correspondingly increasing the intensity of the light at the end of the light guide plate 118. To achieve this, each distance between the minute lens type, i.e., lens shaped, intaglio patterns 130 is set differently from each other. That is, the density of the intaglio patterns 130 increases with increasing distance from the lamp 126.

Figure 6:
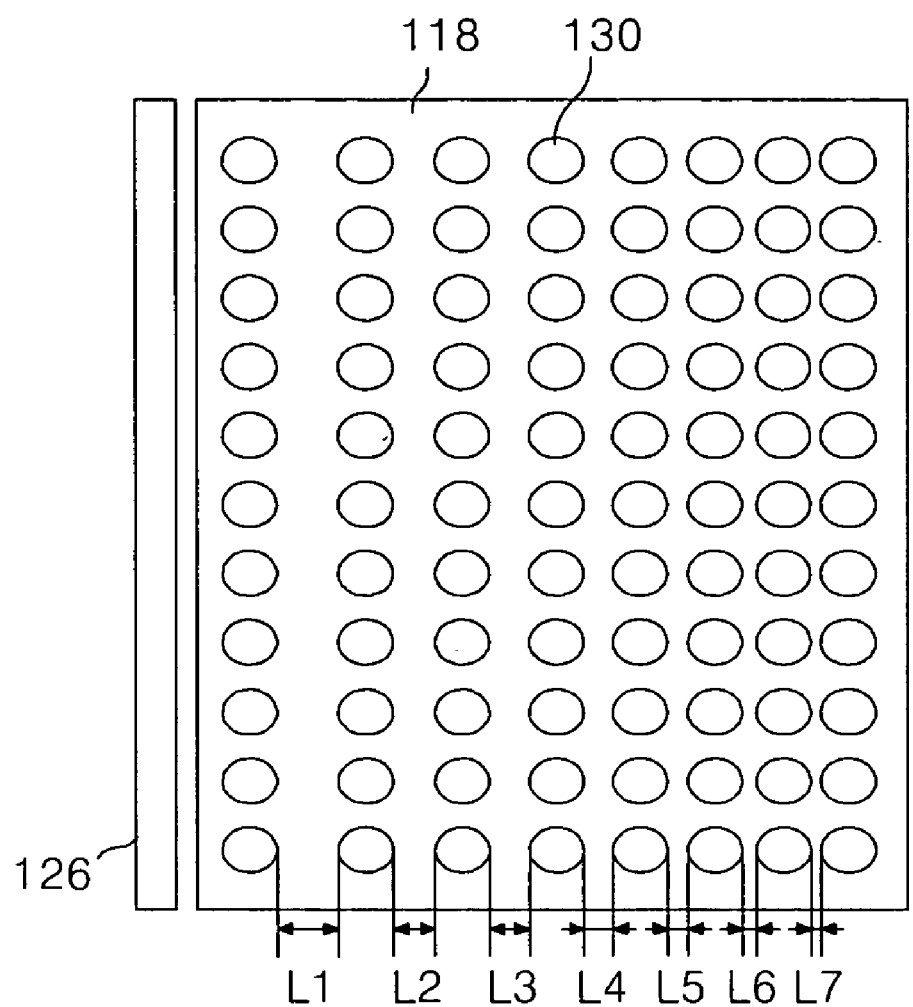
FIG. 6 shows a plan view of a light guide plate having multiple minute lens type intaglio patterns of the device shown in FIG. 4.

More specifically, FIG. 6 shows that as the minute lens type intaglio patterns 130 go from the minute lens type intaglio pattern 130 near the lamp 126 to the minute lens type intaglio pattern 130 near a side surface opposite to the incident surface of the light guide plate 118, each distance (L1 to L7) between the minute lens type intaglio patterns 130 gradually decreases. In other words, as the intaglio patterns 130 go from the light incident side of the light guide plate 118 to the end side of the light guide plate 118, intaglio patterns 130 become densely arranged. Accordingly, as the minute lens type intaglio patterns 130 approach the lamp 126, the intaglio patterns 130 are arranged having a low density. On the other hand, as the intaglio patterns 130 become farther away from the lamp 126, the intaglio patterns 130 are arranged having a high density. Therefore, the intensity of light at the side surface opposite to the incident surface of the light guide plate 118 becomes highly improved by virtue of the minute lens type intaglio patterns 130 arranged in the high density. As a result, the display has uniform lighting.

Figure 7:
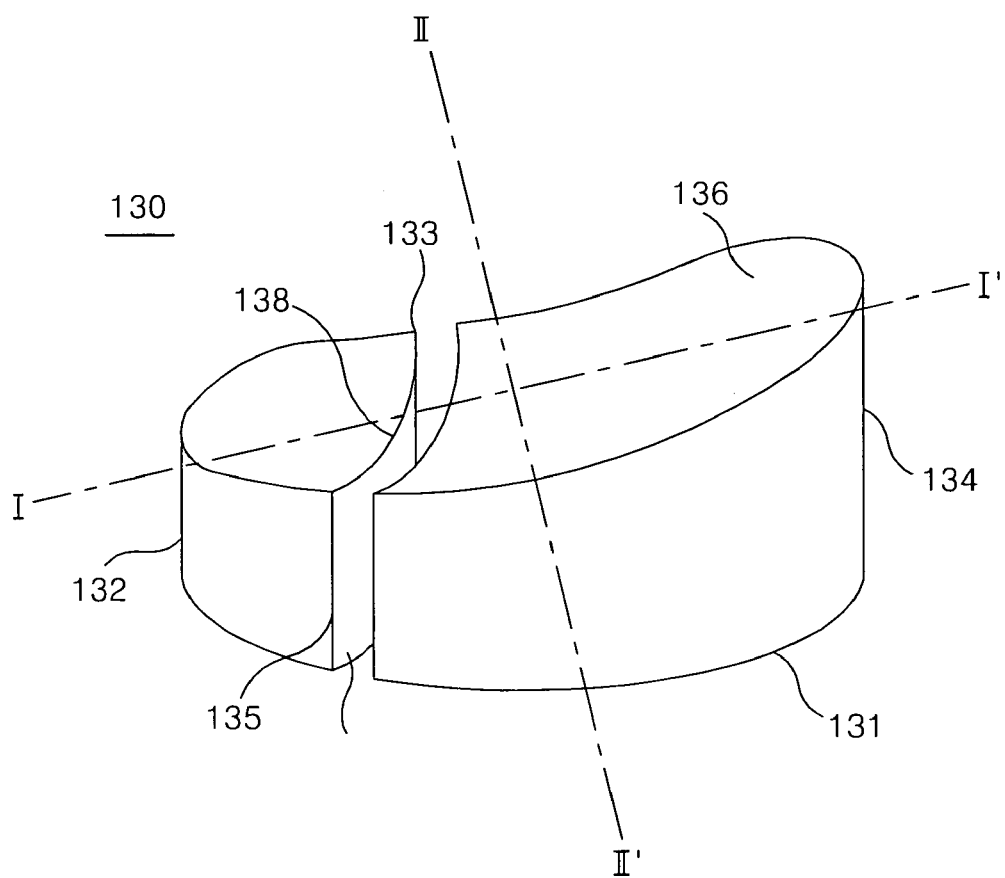
FIG. 7 shows a perspective view of the minute lens type intaglio patterns shown in FIG. 6.

FIG. 7 shows that each of the minute lens type intaglio patterns 130 has a shape of a circular column whose upper surface is rounded on a slant. Each intaglio pattern 130 includes a pillar 131 having a first rounded lateral wall element 132 and a second rounded lateral wall element 134 which have a different height from each other in the first sectional direction. A third lateral wall element 133 and a fourth lateral wall element 135 have the same height in the second sectional direction. A first curved surface 136 is formed between the first and the second rounded lateral wall elements 132 and 134, and a second curved surface 138 is formed between the third and the fourth lateral wall elements 133 and 135.

The second lateral wall 134 (of the first and the second rounded lateral walls 132 and 134) faces to the lamp 126.

The first curved surface 136 and the second curved surface 138 have a curvature R1 and a curvature R2, respectively, that are different from each other. The first curved surface 136 has the first curvature R1 of a first sectional surface, and the second curved surface 138 has the second curvature R2 of a second sectional surface crossing the first sectional surface.

Figure 8:
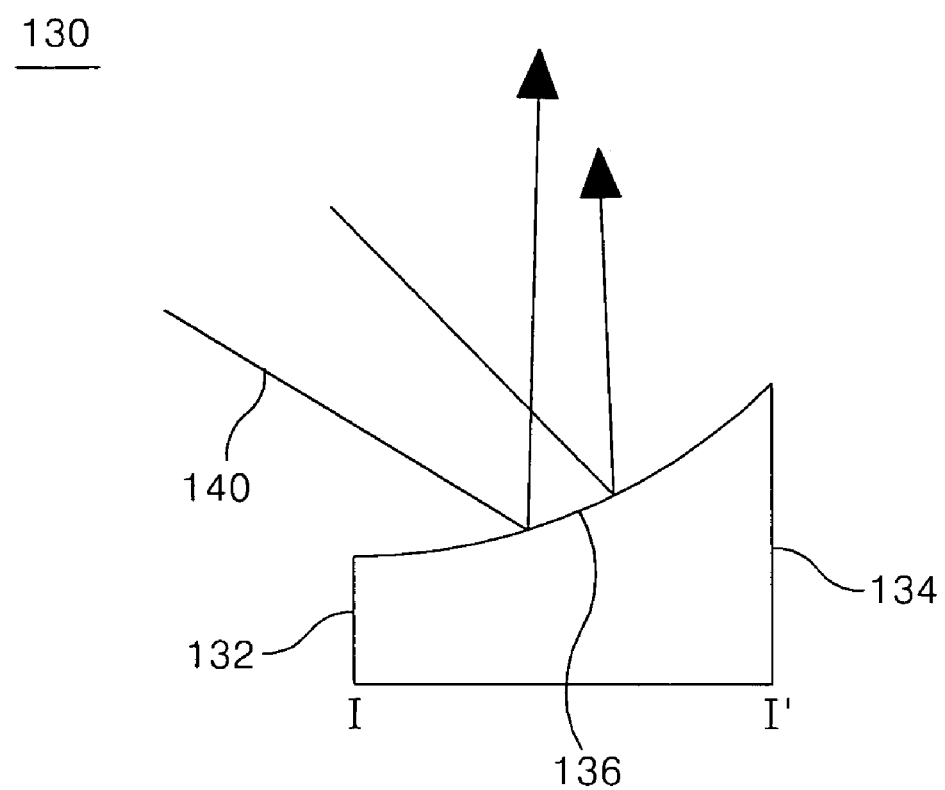
FIG. 8 shows a sectional view illustrating a sectional surface cut along line I-I' in FIG. 7.

FIG. 8 shows that the first curved surface 136 gathers light 140 from the lamp 126 in up and down directions to direct the light 140 toward the light emitting surface. To this end, the first curvature R1 of the first curved surface 136 is set in order to direct the light 140 from the lamp 126 in up and down, i.e., vertical, directions.

Figure 9:
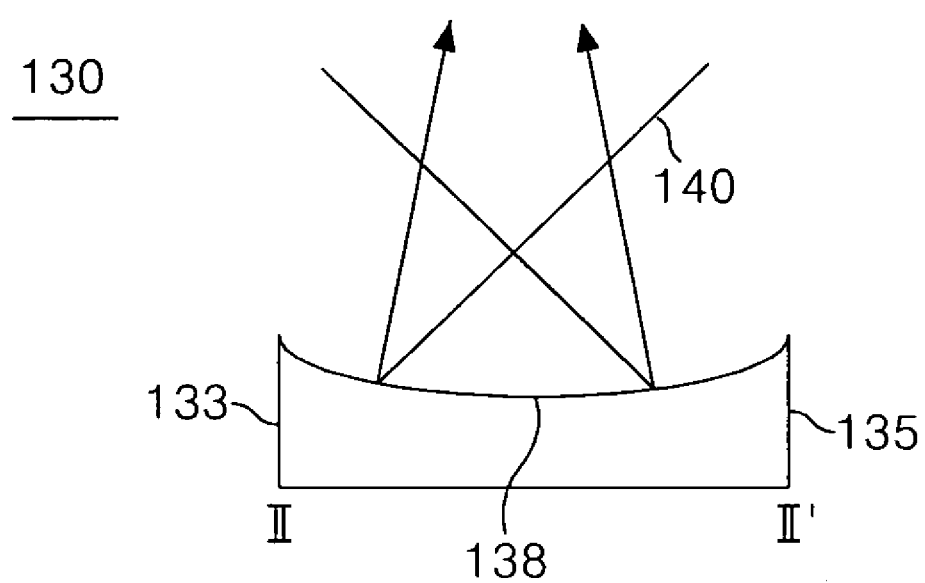
FIG. 9 shows a sectional view illustrating a sectional surface cut along line II-II' in FIG. 7.

Also, the second curved surface 138, as shown in FIG. 9, gathers light 140 emitted from the lamp 126 in left and right directions and directs the light 140 toward the light outgoing surface. To this end, the second curvature R2 of the second curved surface 138 is set to gather the light 140 emitted from the lamp 126 in left and right, i.e., oblique, directions.

The inventive minute lens type intaglio pattern 130 is manufactured using a lithographic galvanoforming (LIGA) method or an ejection (etching) method. If the minute lens type intaglio pattern 130 is formed by the ejection method, then the intaglio pattern is formed in the core of an injection molding by way of an etch. However, the inventive intaglio pattern can be formed by any appropriate process, and the invention is not restricted to LIGA and ejection.

Figure 10:
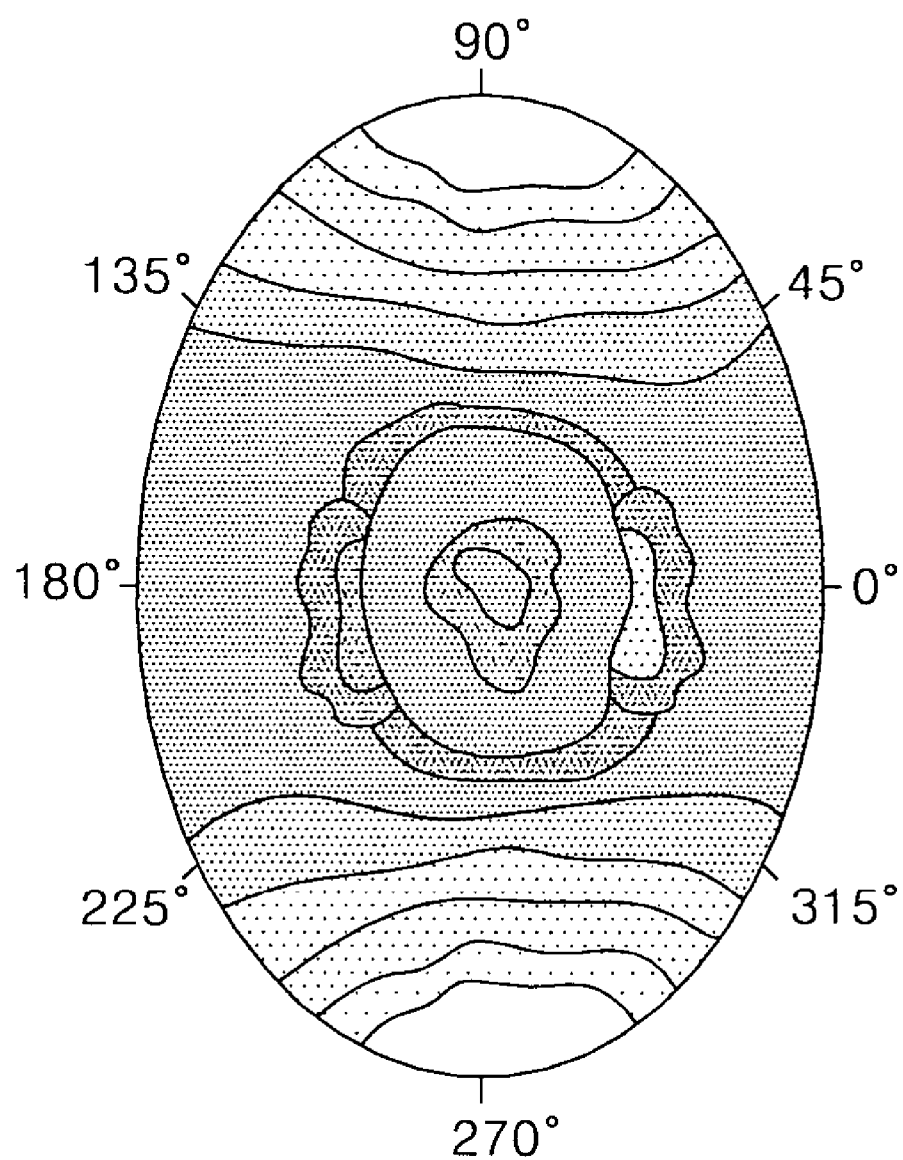
FIG. 10 shows a diagram representing a distribution of a viewing angle of the light guide plate shown in FIG. 5.

The minute lens type intaglio pattern 130 gathers the light 140 entering the light guide plate 118 from the lamp 126 in up and down directions, and in left and right directions. Accordingly, the light guide plate 118 has a distribution characteristic of the viewing angle caused by the minute lens type intaglio pattern 130. As shown in FIG. 10, the viewing angle of the light provided from the light guide plate 118 of the invention is uniform at a full angle, and it can be known that the distribution characteristic of the viewing angle of the light provided from the light guide plate of the invention improves as compared with the distribution characteristic of the viewing angle of the light provided from the related art light guide plate. Thus, the liquid crystal display device according to the first embodiment of the invention can eliminate two prism sheets used in the related art back light unit by virtue of the light guide plate 118 provided with the above-described minute lens type intaglio patterns 130.

The light guide plate 118 functions to uniformly direct the light provided via the light input part, by using the minute lens type intaglio patterns 130, to a light-emitting surface facing the liquid crystal display panel 106. Also, the light progressing toward the rear surface of the light guide plate 118 reflects from the reflection sheet 120, to thereby direct light toward the light outgoing surface.

The liquid crystal display device supports the lamp housing 128 enclosing the lamp 126 by using a bottom cover 124. The bottom cover 124 includes a plane part and a side part perpendicularly bent with respect to each other in order to enclose a rear surface and a side surface in one side of the main support 122. A screw hole through which a screw (not shown) penetrates is formed at the side of the bottom cover 124. The bottom cover 124 is joined by the screw and is fixed in the main support 122.

The top case 102 is manufactured into a square band shape having a plane part and a side part perpendicularly bent with respect to each other. The top case 102 encloses the edge of the liquid crystal display panel 106 and the main support 122. The top case 102 is joined to the main support 122 by a screw (not shown).

As set forth above, the liquid crystal display device according to the first embodiment of the invention perpendicularly redirects the light 140 incident to the light guide plate 118, via the minute lens type intaglio patterns 130 formed on the light guide plate 118. The invention also uniformly distributes the viewing angle of the light outputted from the light guide plate 118 in a large angular range to irradiate the light to the liquid crystal display panel 106. Accordingly, the liquid crystal display device according to the first embodiment of the invention can eliminate the related art prism sheets and can irradiate uniform light, through the use of only one diffusion sheet 110, to the entire surface of the liquid crystal display panel 106. Thus, it becomes possible to improve the display quality of a liquid crystal display device.

Figure 11:
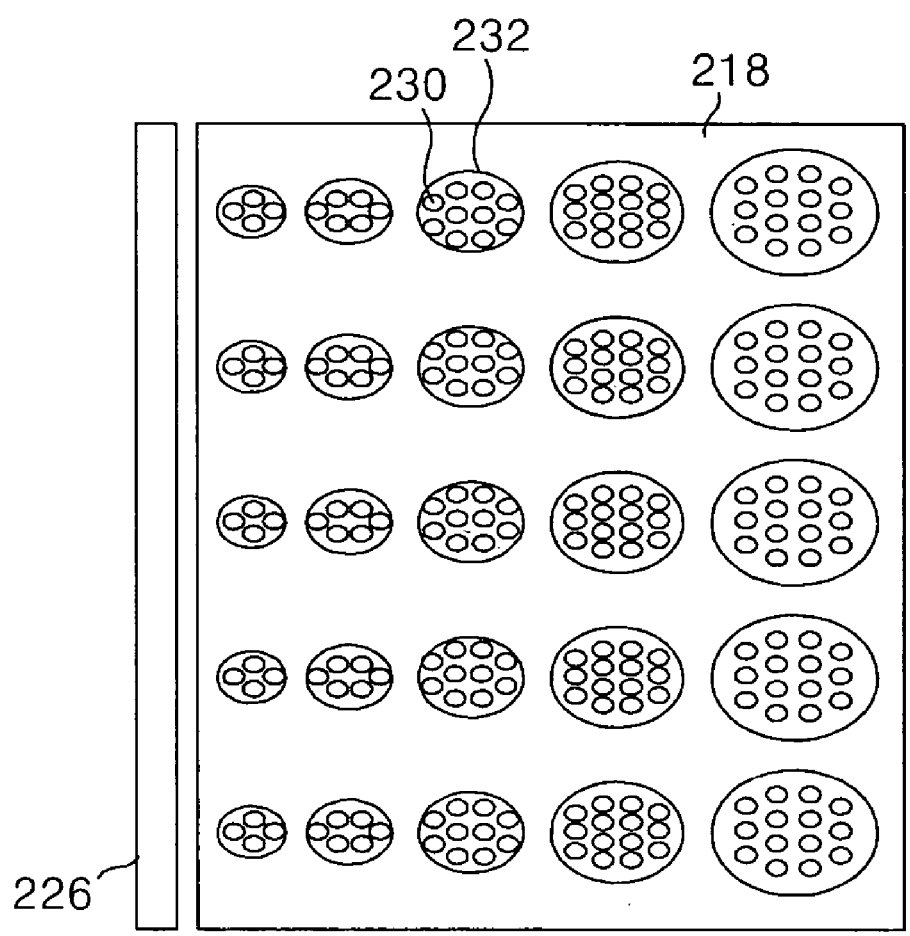
FIG. 11 shows a plan view illustrating multiple intaglio pattern groups formed on the light guide plate of the liquid crystal display device according a second embodiment of the invention.

FIG. 11 shows a liquid crystal display device according to a second embodiment of the invention. This embodiment has configuration elements identical to those of the liquid crystal display device according to the first embodiment of the invention shown in FIG. 4 except for a light guide plate 218. Therefore, an explanation on the liquid crystal display device according to the second embodiment of the invention except will be omitted except for the light guide plate 218. Also, the configuration elements in the second embodiment will be assigned the same reference numerals as those in the first embodiment of the inventive liquid crystal display device.

In the light guide plate 218 of the second embodiment of the invention, multiple intaglio pattern groups 232 having an elliptical shape are formed in a matrix configuration, where each of the intaglio pattern groups 232 has a designated number of minute lens type intaglio patterns 230. Here, the distance between the intaglio pattern groups 232 is about the same.

In the intaglio pattern group 232 that is closer to a lamp 226, the intaglio pattern group 232 has a lower number of minute lens type intaglio patterns 230. Also, as the intaglio pattern group 232 becomes closer to the lamp 226, the intaglio pattern group 232 has a smaller area. Accordingly, the light intensity at the surface opposite to a light incident surface of the light guide plate 218 becomes highly improved by virtue of the intaglio pattern groups 232 with their gradually increased areas.

Each of the minute lens type intaglio patterns 230 (which appear in different numbers in the different intaglio pattern groups 232) has the shape depicted in FIG. 7. That is, each intaglio pattern has a shape of a circular column whose upper surface is rounded on a slant. The minute lens type intaglio patterns 130 includes a pillar 131 having a first rounded lateral wall element 132 and a second rounded lateral wall element 134, which have a different height from each other in the first sectional direction. A third lateral wall element 133 and a fourth lateral wall element 135 have the same height as each other in the second sectional direction. A first curved surface 136 formed between the first and the second rounded lateral wall elements 132 and 134, and a second curved surface 138 formed between the third and the fourth lateral wall elements 133 and 135. Since each of the minute lens type intaglio patterns 230 is identical to that of the liquid crystal display device according to the first embodiment of the invention, a further detailed explanation will be omitted for the sake of simplicity.

The intaglio pattern groups 232, in which the minute lens type intaglio patterns 230 are grouped, gather light entering the light guide plate 218 from the lamp 226. As described above, the intaglio patterns gather light directed in up and down directions, and left and right directions. Thus, the liquid crystal display device according to the second embodiment of the invention can eliminate two prism sheets used in the related art back light unit by virtue of the minute intaglio pattern groups 232 having the minute lens type intaglio patterns 230 grouped differently from each other in the configuration described above.

As a result, the liquid crystal display device according to the second embodiment of the invention raises uprightly, i.e., perpendicularly directs, the light inputted to the light guide plate 218, via the minute intaglio pattern groups 232 having the minute lens type intaglio patterns 230 formed by the number different each other. The invention uniformly distributes the viewing angle of the light outputted from the light guide plate 218 through the use of one diffusion sheet 110, over a large angle range to irradiate the light to the liquid crystal display panel 106. Accordingly, the liquid crystal display device according to the second embodiment of the invention can eliminate the prism sheets used in the related art and can uniformly irradiate an entire surface of the liquid crystal display panel 106 with uniform light through the use of only one diffusion sheet 110. Thus, it becomes possible to improve a display quality of a liquid crystal display device.

Figure 12:
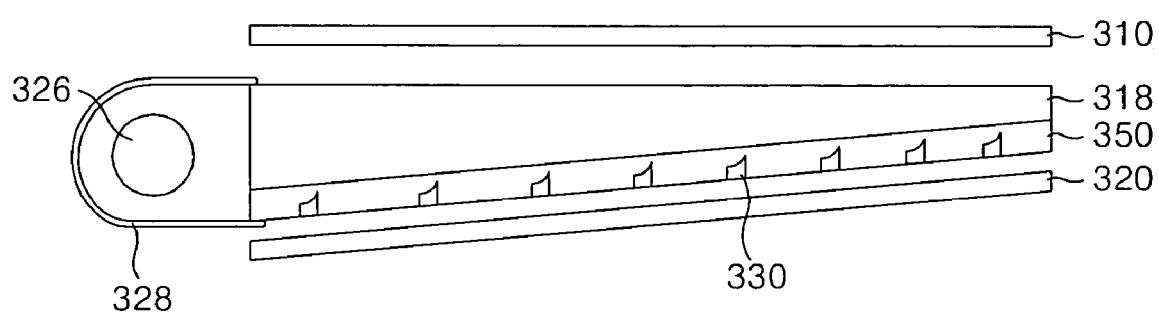
FIG. 12 shows a sectional view illustrating a back light unit of the liquid crystal display device according to a third embodiment of the invention.

FIG. 12 shows a sectional view of a back light unit of the liquid crystal display device according to a third embodiment of the invention.

FIG. 12 shows a the liquid crystal display device that has configuration elements identical to those of the liquid crystal display device according to the first embodiment of the invention shown in FIG. 4 except for a back light unit. Therefore, an explanation of the liquid crystal display device according to the third embodiment of the invention (except for the back light unit) will be omitted. Also, the configuration elements in the fourth embodiment are identical to those in the first embodiment and will be assigned the same reference numerals.

The back light unit according to the third embodiment of the invention includes a lamp 326 irradiating light onto the liquid crystal display panel 106, and a lamp housing 328 encloses the lamp 326. A light guide plate 318 directs the light incident from the lamp 326 toward the liquid crystal display panel 106. A film 350 provided with multiple minute lens type intaglio patterns 330 reflects light incident to the light guide plate 318 at a designated angle. A reflection sheet 320 redirects the light proceeding toward a rear surface of the film 350 toward the liquid crystal display panel 106. A diffusion sheet 310 diffuses the light provided from the light guide plate 318.

The reflection sheet 320 is located at the rear surface of the film 350. The reflection sheet 320 serves to re-reflect light incident thereto, through the rear surface of the film 350, to the light guide plate 318, thereby reducing light loss. In other words, the light from the lamp 326, that proceeds toward the rear surface of the light guide plate 318 and the film 350, reflects from the reflection sheet 320 to progress toward the liquid crystal display panel 106.

The light guide plate 318 changes the path of the light provided from the lamp 326 to be directed toward the liquid crystal display panel 106.

The film 350 converts the path of the light provided via a light incident surface of the light guide plate 318, by using the minute lens type intaglio patterns 330, in up and down directions and left and right directions, to thereby improve the viewing angle characteristic of the light guide plate 318. Also, as the light emitted from the lamp 326 to the light guide plate 318 goes toward an end of the light guide plate 318, the light intensity decreases. Accordingly, in order to make the light provided from the light guide plate 318 uniform, the invention correspondingly increases the intensity of the light at the end of the light guide plate 318. To accomplish this, each distance between the minute lens type intaglio patterns 330 formed on the film 350 is set differently from each other.

Figure 14:
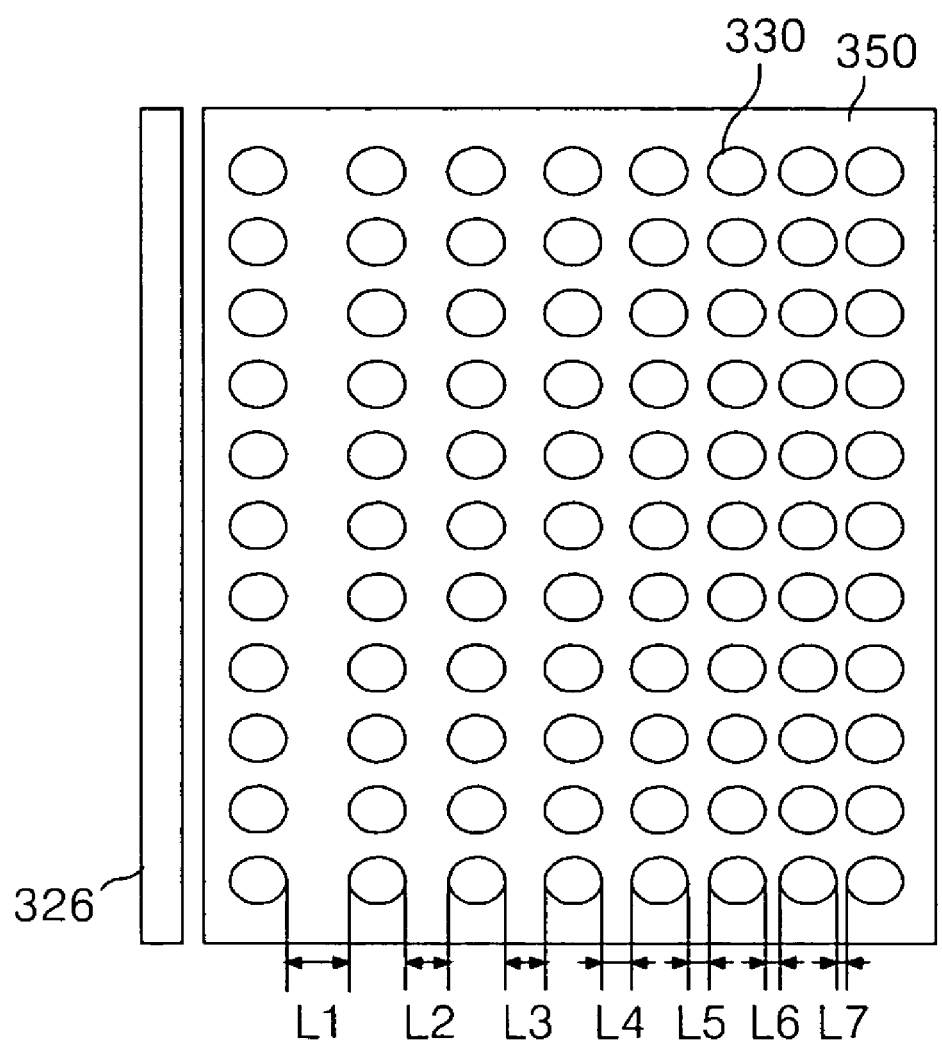
FIG. 14 illustrates a plan view of multiple minute lens type intaglio patterns formed over the film shown in FIG. 12.

More specifically, FIG. 14 shows that as the minute lens type intaglio patterns 330 go from one side of the film 350 near the lamp 326 to the other side opposite to one side of the film 350, each distance (L1 to L7) between the minute lens type intaglio patterns 330 becomes gradually closer. In other words, as the minute lens type intaglio patterns 330 go from one side of the film 350 to the other side, the minute lens type intaglio patterns 330 are more densely arranged. Accordingly, as the minute lens type intaglio patterns 330 approach the lamp 326, the minute lens type intaglio patterns 330 are arranged having a low density. On the other hand, as the minute lens type intaglio patterns 330 become farther from the lamp 326, the minute lens type intaglio patterns 330 are arranged with a higher density. Therefore, the intensity of light at the far side becomes highly improved by virtue of the minute lens type intaglio patterns 330 arranged in a high density.

FIG. 7 shows that each of the minute lens type intaglio patterns 330 has a shape of a circular column whose upper surface is rounded on a slant, which has been already described. Since the minute lens type intaglio pattern 330 is identical to that of the liquid crystal display device according to the first embodiment of the invention, a detailed explanation will be omitted for the sake of brevity.

Figure 15:
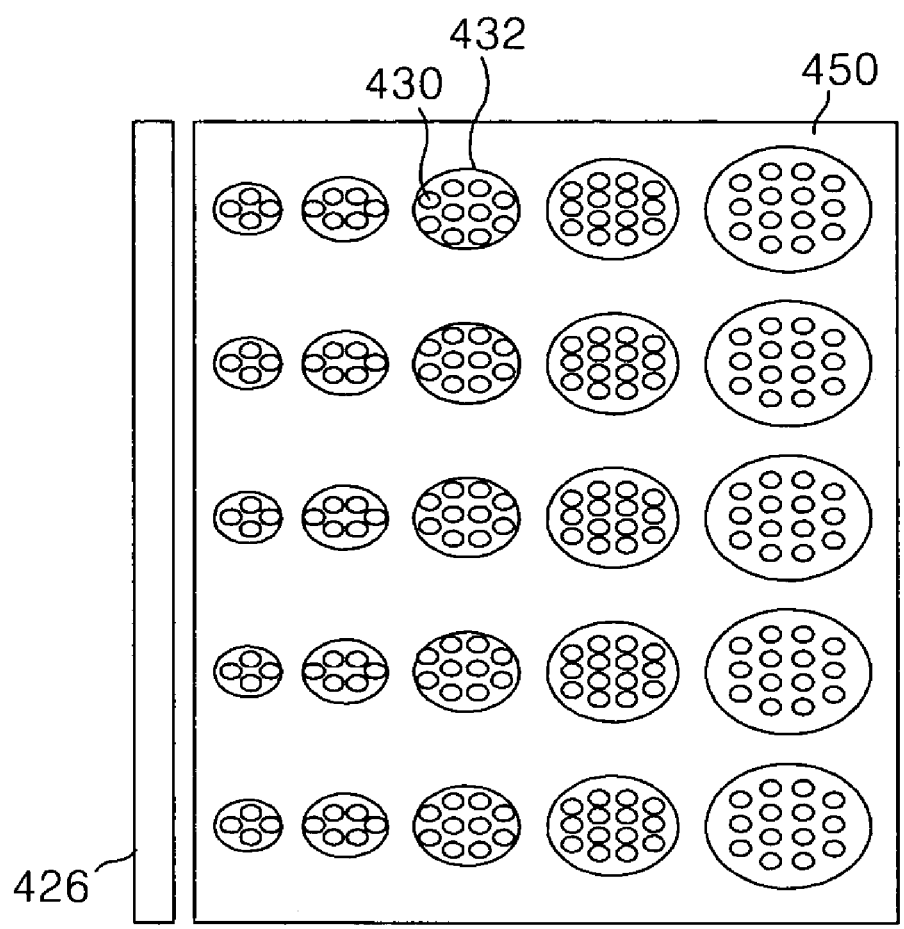
FIG. 15 illustrates a plan view of multiple intaglio pattern group in which the minute lens type intaglio patterns formed on the film shown in FIG. 12 are grouped in a designated number.

FIG. 15 shows that each of the minute lens type intaglio patterns 430 formed on the film 450 is grouped in different numbers, and the intaglio patterns 430 are formed into intaglio pattern groups 432 having different areas from each other. Since the intaglio pattern groups 432 are identical to that of the liquid crystal display device according to the second embodiment of the invention, a detailed explanation will be omitted.

Figure 13:
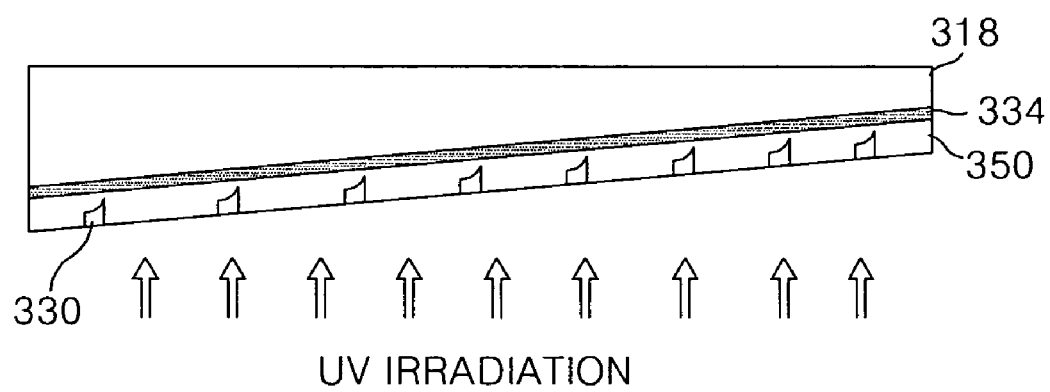
FIG. 13 illustrates a sectional view of a method for adhering the film shown in FIG. 12 to the light guide plate.

The film 350 provided with the minute lens type intaglio patterns 330 is attached on a transparent ultraviolet ray hardened resin layer 334 applied to an inclined rear surface of the light guide plate 318, as shown in FIG. 13.

A preferred method of attaching the film 350 having the minute lens type intaglio patterns 330 to the rear surface of the light guide plate 318 as performed as follows. First, a transparent ultraviolet light hardenable resin layer 334 is applied to the inclined rear surface of the light guide plate 318. The ultraviolet light hardenable resin layer 334 can be typically formed from an acrylic or methacrylic polymer resin. Then, the film 350 having the minute lens type intaglio patterns 330 is arranged and attached to the ultraviolet light hardenable resin layer 334 applied to the rear surface of the light guide plate 318. Subsequently, the ultraviolet light is irradiated to the film 350 attached to the ultraviolet light hardenable resin layer 334, to thereby attach the film 350 to the rear surface of the light guide plate 318.

As set forth above, the liquid crystal display device according to the third embodiment of the invention directs the light inputted to the light guide plate 318 in an upright direction, through the minute lens type intaglio patterns 330 formed on the film 352 attached to the rear surface of the light guide plate 318. A uniform distribution the viewing angle of the light output from the light guide plate 318 is achieved over a large angle range to irradiate the liquid crystal display panel. Accordingly, the liquid crystal display device of the third embodiment of the invention can eliminate the prism sheets used in the related art and can uniformly irradiate light by using only one diffusion sheet 110 to an entire surface of the liquid crystal display panel. Thus, it is possible to improve the luminance and display quality of a liquid crystal display device.

Figure 16:
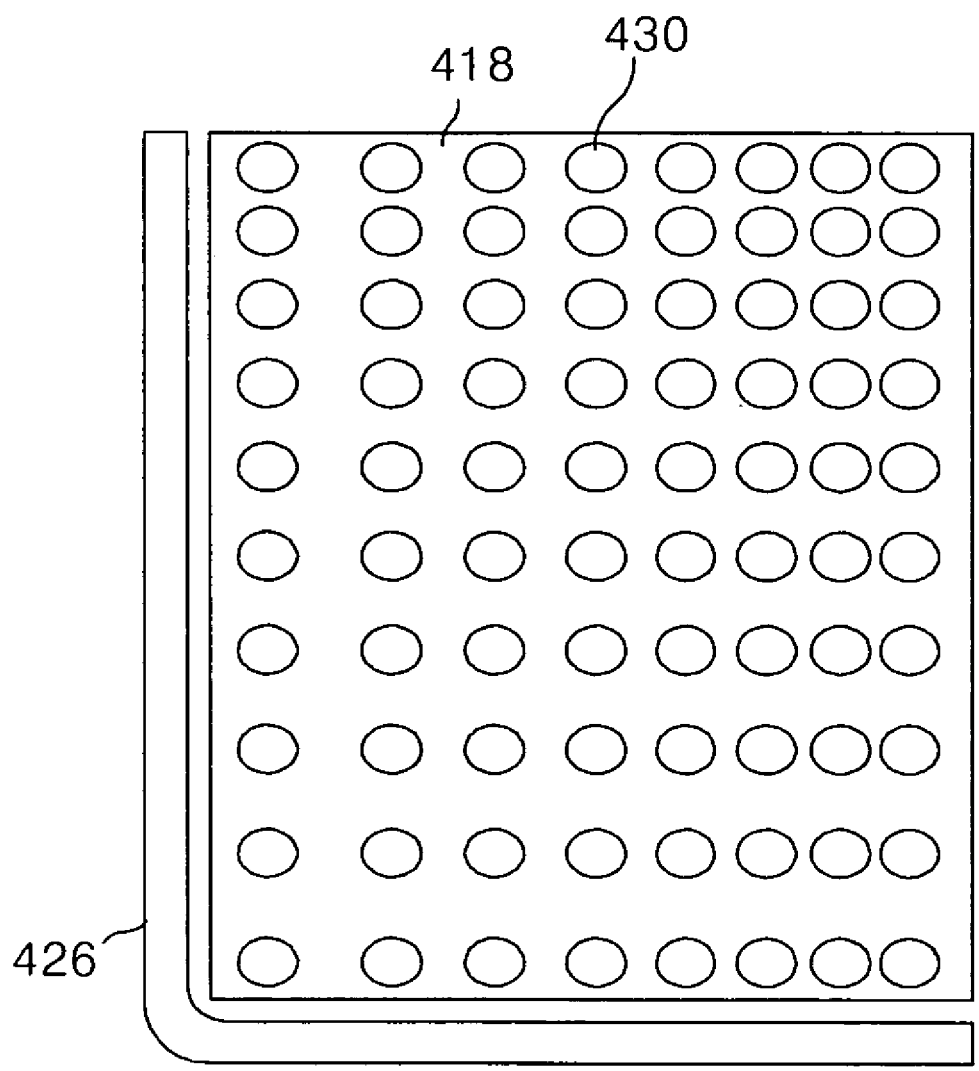
FIG. 16 shows a plan view illustrating a light guide plate and an L-shape lamp of a liquid crystal display device according to another embodiment of the invention.

Also, in the liquid crystal display devices according to the fist to the third embodiments of the invention, the lamps 126, 226 and 326 irradiate the light to the light guide plates 118, 128 and 318, respectively. Alternately, the lamp can be bent in a shape of letter L, as shown in FIG. 16. The lamp 426 with the L shape is installed to face to one side surface and an upper side surface of the light guide plate 418 or to face to one side surface and a lower side surface of the light guide plate 418. This lamp configuration can remedy a dark phenomenon in an edge of the light guide plate 418 through the use of the lamp 426 with the L shape. Further, the liquid crystal display device can improve the viewing angle characteristic of the light guide plate 418 by converting the path of light provided via an incident surface of the light guide plate 418 to up and down directions and left and right directions through the use of the minute lens type intaglio patterns 333. Here, the density of the intaglio pattern increases with increasing distance from the lamp.

The liquid crystal display devices according to the embodiments of the invention described above can be employed in a small-sized liquid crystal displays using multiple light-emitting diodes as a light source, such as personal digital assistants (PDA) or mobile phones. Accordingly, the liquid crystal display device according to the invention raises color purities of lights generated form the light-emitting diodes by using the light guide plate having the minute lens type intaglio patterns as described above, so that the technology can be applied to small-sized liquid crystal display devices having a back light unit without having two prism sheets. The cost of producing the device is accordingly reduced.

As described above, the liquid crystal display device according to the invention includes a light guide plate provided with the minute lens type intaglio patterns or the intaglio pattern groups. Accordingly, the invention uprightly redirects the light input to the light guide plate by using the minute lens type intaglio patterns or the minute intaglio pattern groups. The invention uniformly distributes the viewing angle of the light output from the light guide plate by using one diffusion sheet in irradiate the light to the liquid crystal display panel over a large angular range. Accordingly, the invention can eliminate the prism sheets to thereby decrease the thickness of the liquid crystal display device. Further, the invention uniformly irradiates the light, while using only one diffusion sheet, to an entire surface of the liquid crystal display panel. It is thus possible to improve the display quality of a liquid crystal display device.

Although the invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
   a liquid crystal display panel;
   a lamp irradiating light to the liquid crystal display panel;
   a light guide plate converting the light from the lamp into a surface light to irradiate to the liquid crystal display panel; and
   a plurality of patterns, each of the patterns being formed in the light guide plate and having a first curvature of a first sectional surface and a second curvature of a second sectional surface which are different from each other,
   wherein each of the patterns includes:
   a pillar having a first lateral wall element and a second lateral wall element which have different heights from each other in a direction of the first sectional surface, and a third lateral wall element and a fourth lateral wall element which have same heights with each other in a direction of the second sectional surface;
   a first curved surface formed between the first and the second lateral wall elements; and
   a second curved surface formed between the third and the fourth lateral wall elements.

2. The device according to claim 1, wherein any one of the first and the second lateral wall elements faces toward the lamp.

3. The device according to claim 1, wherein the patterns are substantially arranged in a matrix.

4. The device according to claim 3, wherein distances between the patterns become narrower as the patterns are farther from the lamp.

5. The device according to claim 1, wherein the patterns are gathered in a designated number to form pattern groups.

6. The device according to claim 5, wherein a number of the patterns grouped in each of the pattern groups increases as the pattern groups are farther from the lamp.

7. The device according to claim 5, wherein the patterns are grouped substantially in a shape of an ellipse in each of the pattern groups.

8. The device according to claim 1, wherein the lamp is arranged to face to one side surface of the light guide plate.

9. The device according to claim 1, wherein the lamp is bent to be faced to at least two side surfaces of the light guide plate.

10. The device according to claim 9, wherein the patterns increase in density with increasing distance from the lamp.

11. A liquid crystal display device comprising:
    a liquid crystal display panel;
    a lamp irradiating light to the liquid crystal display panel;
    a light guide plate converting the light from the lamp into a surface light to irradiate to the liquid crystal display panel;
    a film attached to a rear surface of the light guide plate; and
    multiple patterns, each of the patterns being formed in the film and having a first curvature of a first sectional surface and a second curvature of a second sectional surface which are different from each other, wherein each of the patterns includes:

a pillar having a first lateral wall element and a second lateral wall element which have different heights from each other in a direction of the first sectional surface, and a third lateral wall element and a fourth lateral wall element which have same heights with each other in a direction of the second sectional surface;

a first curved surface formed between the first and the second lateral walls; and a second curved surface formed between the third and the fourth lateral walls.

12. The device according to claim 11, wherein any one of the first and the second lateral walls faces toward the lamp.

13. The device according to claim 11, wherein the patterns are substantially arranged in a matrix.

14. The device according to claim 13, wherein distances between the patterns become narrow as the patterns are farther from the lamp.

15. The device according to claim 11, wherein the patterns are gathered in a designated number to form pattern groups.

16. The device according to claim 15, wherein the number of the patterns grouped in each of the pattern groups becomes increases as the pattern groups are farther from the lamp.

17. The device according to claim 15, wherein the patterns are grouped in a shape of an ellipse in each of the pattern groups.

18. The device according to claim 11, further comprising an ultraviolet-hardening resin attaching the film to the light guide plate.

19. A light guide plate, which comprises:

a plurality of patterns, each of the patterns being formed in the light guide plate and having a first curvature of a first sectional surface and a second curvature of a second sectional surface which are different from each other, wherein each of the patterns includes:

a pillar having a first lateral wall element and a second lateral wall element which have different heights from each other in a direction of the first sectional surface, and a third lateral wall element and a fourth lateral wall element which have same heights with each other in a direction of the second sectional surface;

a first curved surface formed between the first and the second lateral wall elements; and a second curved surface formed between the third and the fourth lateral wall elements.

20. The light guide plate according to claim 19, wherein any one of the first and the second lateral wall elements faces toward a lamp.

21. The light guide plate according to claim 19, wherein the patterns are substantially arranged in a matrix.

22. The light guide plate according to claim 21, wherein distances between the patterns become narrower as the patterns are farther from a lamp.

23. The light guide plate according to claim 19, wherein the patterns are gathered in a designated number to form pattern groups.

24. The light guide plate according to claim 23, wherein a number of the patterns grouped in each of the pattern groups increases as the pattern groups are farther from a lamp.

25. The light guide plate according to claim 23, wherein the patterns are grouped substantially in a shape of an ellipse in each of the pattern groups.

26. The light guide plate according to claim 19, wherein a lamp is arranged to face to one side surface of the light guide plate.

27. The light guide plate according to claim 19, wherein a lamp is bent to be faced to at least two side surfaces of the light guide plate.

28. The light guide plate according to claim 27, wherein the patterns increase in density with increasing distance from the lamp.

29. The light guide plate according to claim 19, wherein a base film is attached to a rear surface of the light guide plate.

30. The light guide plate according to claim 29, further comprising an ultraviolet-hardening resin attaching the film to the light guide plate.

* * * * *